US007940285B2

(12) United States Patent
Would et al.

(10) Patent No.: US 7,940,285 B2
(45) Date of Patent: May 10, 2011

(54) METHOD AND SYSTEM FOR RE-ARRANGING A DISPLAY

(75) Inventors: Daniel E. Would, Basingstoke (GB); Scott J. Clee, Winchester (GB); Peter B. Masters, Chandler's Ford (GB)

(73) Assignee: International Business Machines Corporation, Armonk, NY (US)

( * ) Notice: Subject to any disclaimer, the term of this patent is extended or adjusted under 35 U.S.C. 154(b) by 1277 days.

(21) Appl. No.: 11/242,657

(22) Filed: Oct. 3, 2005

(65) Prior Publication Data

US 2006/0086022 A1    Apr. 27, 2006

(30) Foreign Application Priority Data

Oct. 9, 2004  (GB) .................................. 0422500.9

(51) Int. Cl.
*G09G 5/00* (2006.01)

(52) U.S. Cl. ........ 345/637; 345/629; 345/632; 345/633; 345/634; 345/636; 382/180

(58) Field of Classification Search .................. 345/637, 345/633; 463/6
See application file for complete search history.

(56) References Cited

U.S. PATENT DOCUMENTS

| | | | |
|---|---|---|---|
| 4,550,315 A | 10/1985 | Bass et al. | |
| 5,269,687 A * | 12/1993 | Mott et al. | ....................... 434/69 |
| 5,734,380 A | 3/1998 | Adams et al. | |
| 5,757,268 A * | 5/1998 | Toffolo et al. | ................ 340/461 |
| 5,825,360 A | 10/1998 | Odam et al. | |
| 6,289,332 B2 | 9/2001 | Menig et al. | |
| 6,724,403 B1 | 4/2004 | Santoro et al. | |
| 2001/0030667 A1 | 10/2001 | Kelts | |
| 2003/0020671 A1 | 1/2003 | Santoro et al. | |
| 2003/0132959 A1 | 7/2003 | Simister et al. | |
| 2004/0178894 A1 * | 9/2004 | Janssen | ......................... 340/435 |

OTHER PUBLICATIONS

B. Bell, S. Feiner, T. Hollerer, "View Management for Virtual and Augmented Reality", Nov. 14, 2001, ACM, Proceedings of the 14th Annual ACM Symposium on User Interface Software and Technology, pp. 101-110.*

Vineet Thanedar and Tobias Hollerer, "Semi-automated Placement of Annotations in Videos", Apr. 2004, University of California, Santa Barbara, Department of Computer Science, Technical Report.*

Alex Leykin and Mihran Tuceryan, "Automatic determination of text readability over textured backgrounds for augmented reality systems", Nov. 5, 2004, IEEE/ACM, Third IEEE and ACM International Symposium n Mixed and Augmented Reality, 2004, pp. 224-230.*

* cited by examiner

*Primary Examiner* — Daniel Washburn
*Assistant Examiner* — Robert Bader
(74) *Attorney, Agent, or Firm* — David Mims; Mark P. Kahler

(57) ABSTRACT

A method and system are described for re-arranging a display in a viewable area. The method comprises dividing the viewable area into units; determining the contents of units of the viewable area; prioritizing the availability of the units by content; and allocating one or more display items in the prioritized available units. A plurality of display items is provided and the display items are allocated according to a determined order which may depend on one or more of a user preference, the contents of the viewable area, the activity of the user, and environmental parameters.

11 Claims, 7 Drawing Sheets

METHOD AND SYSTEM FOR RE-ARRANGING A DISPLAY

BACKGROUND

This invention relates to the field of re-arranging a display in a viewable area. In particular, this invention relates to re-arranging a display in response to dynamic feedback.

Human interaction with digital displays is subject to constant attempts to improve. Graphical User Interfaces (GUIs) are popular but limited display space can mean a cluttered desktop. Solutions to desktop limitations include simple tool bars showing open windows that allow you to switch between active tasks, the ability to tile windows, and more recently Mac OS X (trade marks of Apple Computer, Inc.) have provided a feature that allows the temporary tiling of windows for tasks for the duration of a key press, snapping back to previous arrangement when the key is released. All of these systems have their benefits, but none truly optimizes the desktop space available.

In the world of augmented reality in which a computer display is overlaid on the real world, there is the issue of a finite field of vision. None of the solutions to desktop limitations applies easily to augmented reality displays. Simply stated, the problem is providing the best selection of data in a limited space, be that a monitor display, or a heads up display (HUD) imposed on a field of vision.

BRIEF SUMMARY

The aim of the present invention is to provide an improved display.

In the context of a GUI, the available viewing area is divided into minimum display units. For example, minimum display units may be something big enough to display a single icon (e.g. in the form of a button, readout etc). This would form a virtual grid on the viewable area. On a real time basis, the units of the grid can be given values that indicate their appropriateness for having system displays placed in them, where a system display would be anything that is not the last one or two accessed windows.

By prioritizing the items available to display (based on predefined user preferences), items can be matched up with appropriate available grid units dynamically, and potentially removed from the display entirely when no suitable space is left for allocation. This has the advantage that the user simply needs to move the window(s) that he is interested in, and the desktop will dynamically bring the most relevant things into available window slots. This minimizes the time required to access functions.

In a game world, where first person games often use a HUD, game artificial intelligence could make similar judgments based on what environment the player is in. For example, if a player is running down a corridor where most of the display is walls, there is no problem displaying lots of helpful info, but in a wide open space where you might want most of the display uncluttered all but the most high priority displays can disappear, leaving remaining display to shift to the smaller area of "unimportant" viewing area (typically the ground).

This also applies to HUD's that are beginning to find their way into cars and motorbikes. This kind of technology is beginning to bring more information into people's field of view, but currently such information is fixed position. By utilizing information gathered on the direction of the road, the HUD could use this grid/priority system to move display components away from important areas. A good example would be that while driving around a bend, a driver needs to glance along the bend which is off to one side of his vision, while also watching the road immediately in front, this system would simply move elements away from that area while it is important to keep clear, and re-use it as soon as it will no longer obscure the driver's view.

As the wealth of data available increases, and the best mechanism to accumulate that information remains through visual and audio queues (where audio is limited due to people's ability to differentiate overlapped sounds), then more and more intelligent ways are needed to display useful/important data in what is a relatively fixed field of vision.

According to a first aspect of the present invention there is provided a method for re-arranging a display in a viewable area, comprising: dividing the viewable area into units; determining the contents of units of the viewable area; prioritizing the availability of the units by content; and allocating one or more display items in the prioritized available units.

Preferably, a plurality of display items are provided and are allocated according to a determined order. The determined order may be by one or more of the following determinations: a user preference; the contents of the viewable area; the activity of the user; and environmental parameters. For example, the priority order of display items may be changed depending on the contents of the viewable area, the activity of the user or environmental parameters, at a given time. In this way, if the user is carrying out a particular task, for example, the display items relating to that task may take priority.

The number of display items may be determined by one or more of the following determinations: a user preference; the contents of the viewable area; the activity of the user; and environmental parameters. The number of display items may vary depending on user preferences, the contents of the viewable area, the activity of the user or environmental parameters, at a given time. For example, a limited number of display items may be provided if the user is undertaking a complicated task that requires few distractions.

The one or more display items may have allocation preferences determining their position and association with other display items. For example, a display item may have an allocation preference to be displayed adjacent a specified other display item.

The step of determining the contents of the viewable area may translate the contents into computer understood terms. In the case of the viewable area being a graphical user interface of a computer or game console, the contents of the viewable area may already be in computer understood terms. However, the contents of the viewable area in the case of a heads up display in a vehicle may need to be interpreted into computer understood terms.

The step of prioritizing the availability of the units by content may exclude some units from availability for display. Units in which the content is very important to be seen by the user may be excluded from displaying display items.

The viewable area may be divided into a virtual grid of grid units.

The steps of determining the contents of units of the viewable area, prioritizing the availability of the units by content, and allocating one or more display items in the prioritized available units may be repeated at regular intervals. Alternatively, the steps of determining the contents of units of the viewable area, prioritizing the availability of the units by content, and allocating one or more display items in the prioritized available units may be repeated when the content changes.

According to a second aspect of the present invention there is provided a system for re-arranging a display in a viewable area, comprising: means for dividing the viewable area into units; recognition means for determining the contents of the units of the viewable area; an expert system for prioritizing the availability of the units by content; and means for allocating one or more display items in the prioritized available units.

The expert system may use heuristic rules to rate the importance of seeing units of the viewable area.

The means for dividing the viewable area may divide the viewable area into a virtual grid with grid units.

In one embodiment, the viewable area is a graphical user interface and the units are the minimum size for a graphical icon. The contents of the viewable area may be current graphical user interface displays and the display items may be any one or more of application icons, data icons, toolbars, system preferences and settings, and non-current application interfaces.

In another embodiment, the viewable area is a heads up display in a vehicle and the contents of the viewable area is a real time view of the vehicle environment. The display items may be information display items including one or more of control information, direction information, environment information, entertainment information. The recognition means may include means for real time video feed of the viewable area and conversion to computer understood terms.

In a further embodiment, the viewable area is a computer game display.

According to a third aspect of the present invention there is provided a computer program product stored on a computer readable storage medium, comprising computer readable program code means for re-arranging a display in a viewable area by performing the steps of: dividing the viewable area into units; determining the contents of units of the viewable area; prioritizing the availability of the units by content; and allocating one or more display items in the prioritized available units.

Embodiments of the present invention will now be described, by way of examples only, with reference to the accompanying drawings in which:

DETAILED DESCRIPTION

Figure 1:
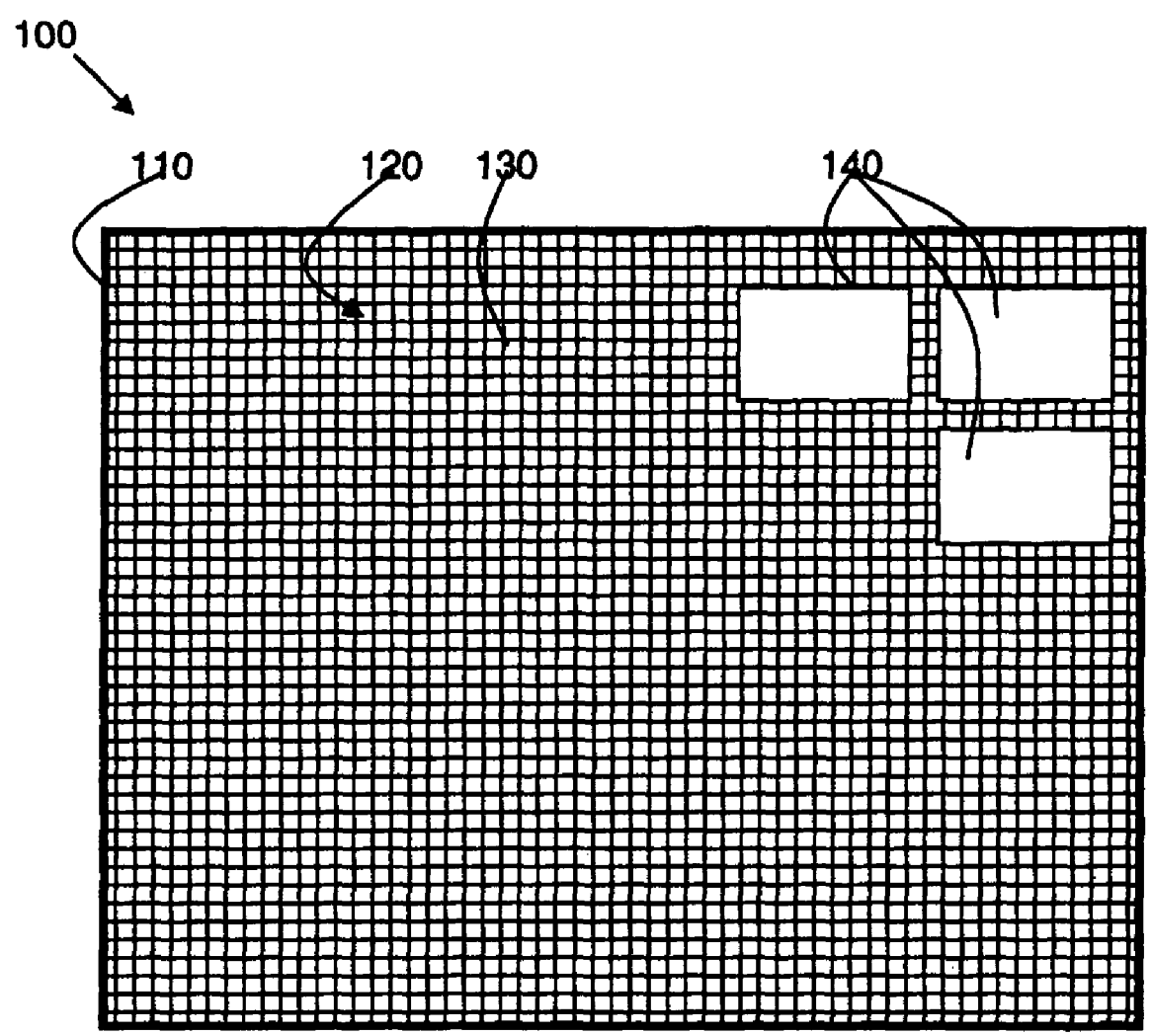
FIG. 1 is a schematic diagram of a viewable area in accordance with the present invention.

Referring to FIG. 1, a display system 100 is provided in which a viewable area 110 is divided into a virtual grid 120 of grid units 130. The grid units 130 may each be the size of a minimum display unit. The nature of the data in the viewable area 110 is determined. The data in the viewable area 110 is assigned to one or more grid units 130 by location and prioritized according to the nature of the data. The priorities of the data are user configurable. Grid units containing low priority data are then considered to be available to display other display items 140.

The display items 140 may be information relating to the data in the viewable area or relating to some other task or application. The display items 140 may also be prioritized so that the available grid units display the most important information. The prioritizing of the display items 130 may relate to the nature of the data in the viewable area at any time.

Three embodiments of display systems are described as examples; however, the described system may be applied to a wide range of display applications.

The first embodiment is a GUI of a computer system in which the viewable area 110 is a computer display such as a desktop or monitor screen. Data in the viewable area 110 is determined by the currently used applications. The display items 130 may be icons for other applications, other non-current windows, system preferences and parameters, etc.

The second embodiment is a HUD for use in a vehicle in which information is displayed in the field of view of the driver of the vehicle. The viewable area 110 is the field of view and the data in the viewable area 110 is the view seen by the driver of the road and surrounding objects. The display items 130 which are displayed in the HUD superimposed on the driver's field of view may be driving control parameters, direction information, etc.

The third embodiment is a game system in which the viewable area 110 is the game display and the data in the viewable area is the scene of the game. The display items may be in the form of control parameters, information regarding the score, the characters, etc.

All three embodiments the system can be broken into the same processing steps, as follows:

1. Identify the data in the viewable area in a form the computer understands;

2. Use an expert system with heuristic rules relevant to the application to rate:

a. the importance of seeing certain parts of the viewable area, and b. the display items that should be displayed;

3. Place as many of the available display items as there is space for;

4. Repeat at a suitable refresh rate for the system or when the data in the viewable area changes.

Figure 2:
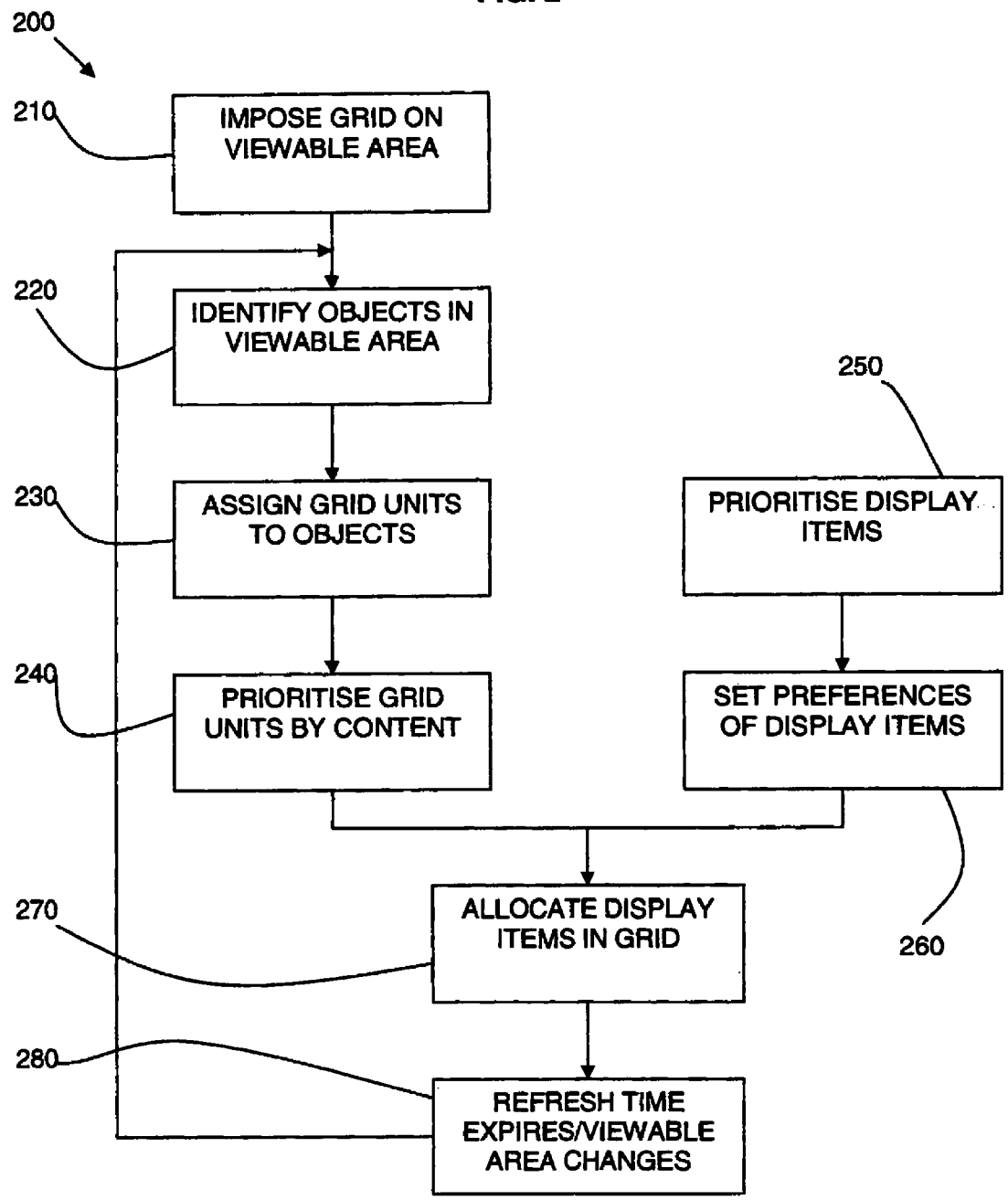
FIG. 2 is a flow diagram of a method in accordance with the present invention.

Referring to FIG. 2, the method or process of the display system is shown in the form of a flow diagram 200. In the first step 210, a grid is imposed on the viewable area. Objects are identified in the viewable area 220 and assigned grid units 230. The grid units are then prioritized by content 240. In a parallel process, display items are prioritized 250 with display preferences 260. The display items may be dependent on the objects in the viewable area. As many display items as possible are allocated to positions in the grid 270. The display items are refreshed after a period of time or when the objects in the viewable area change 280. The process then loops back to again identify objects in the viewable area 220.

Figure 3:
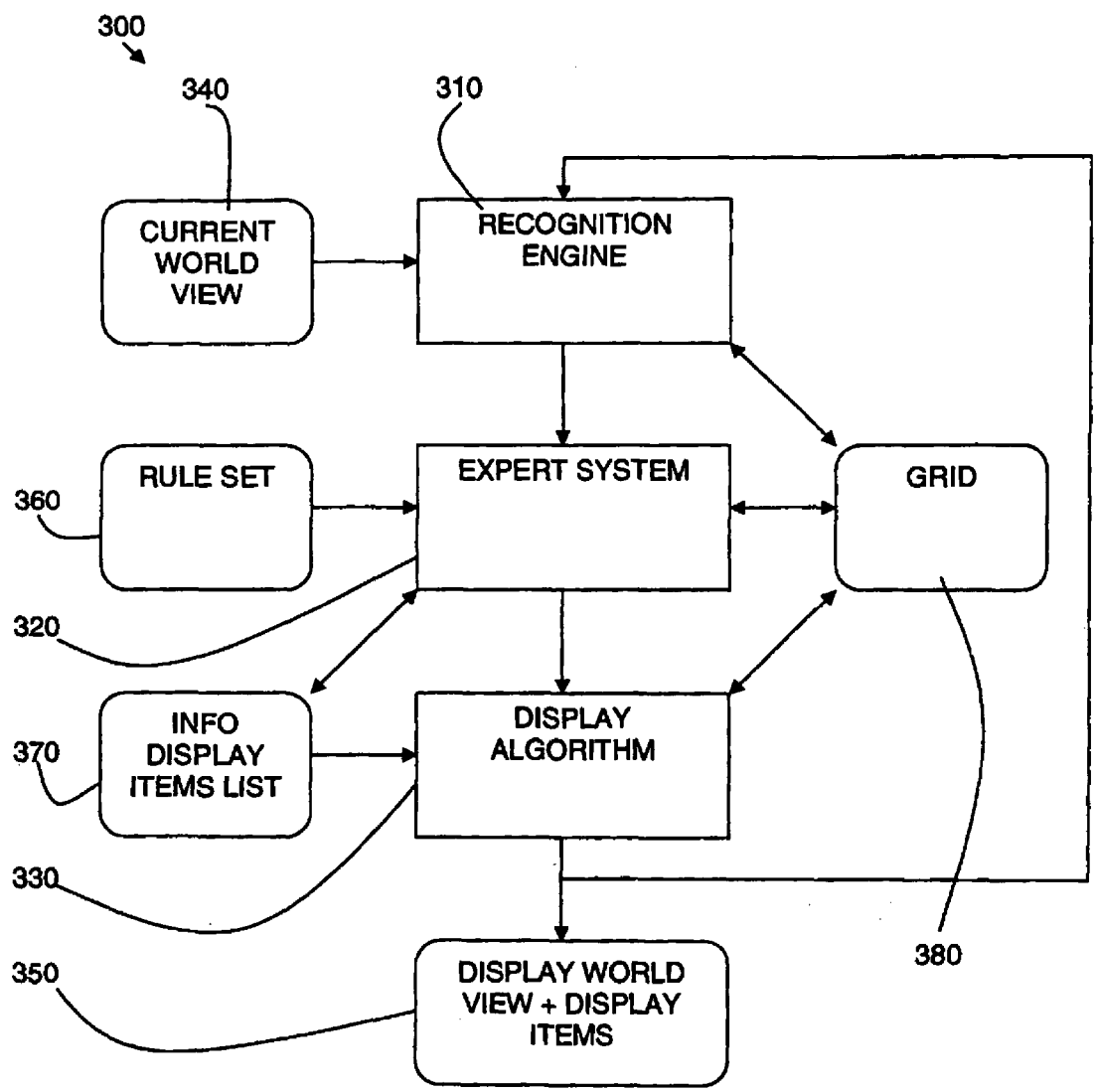
FIG. 3 is a process diagram of a system in accordance with the present invention.

Referring to FIG. 3, a process diagram 300 illustrates the flow of control and information/data repositories.

The process diagram 300 shows system entities as rectangular boxes through which the flow of control passes. The boxes show a recognition engine 310 which recognizes the content of the viewable area, an expert system 320 which is rule based logic processing, for example, which can be done in languages such as LISP, and a display algorithm 330 for determining the display items to be displayed.

The rounded boxes represent data, including the input world view (the content of the viewable area) 340 and the output world view with placed display items 350. The data also includes, the rule set 360, the list of display items 370 and the grid 380.

The current world view 340 is processed by the recognition engine 310 to determine the nature of the content of the world view 340. A grid 380 is also applied to the world view by the recognition engine 310 in order to determine the location of the content. An expert system 320 applies a rule set 360 to the content of the world view provided by the recognition engine 310 and determines the priority of grid locations. A display algorithm 330 allocates display items from the list 370 and outputs a display 350 of the world view with display items.

Each of the embodiments will now be described in detail.

Figure 4A:
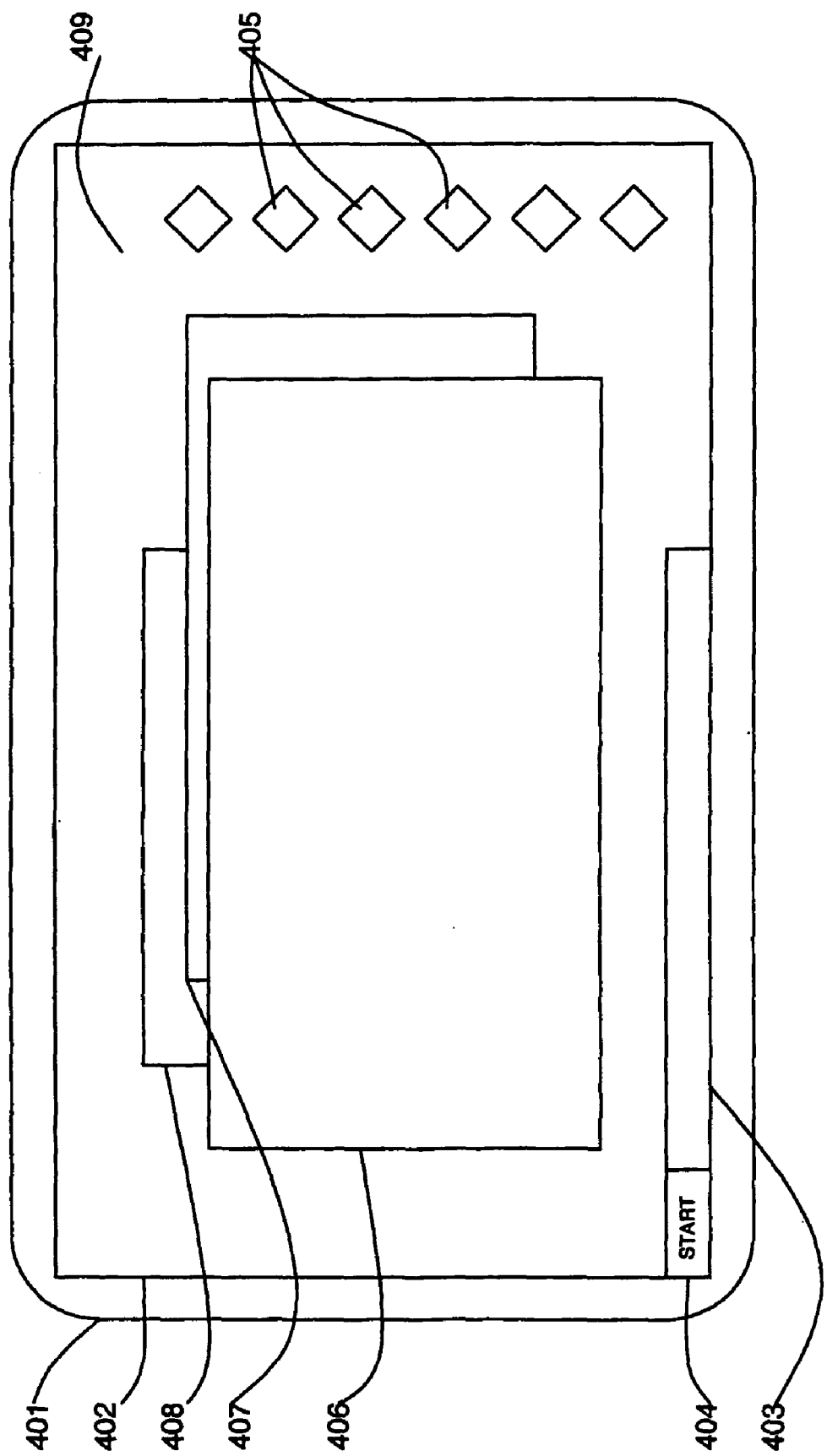
FIGS. 4A and 4B are schematic diagrams of a GUI in accordance with a first embodiment of the present invention.

In the first embodiment, the viewable area is a computer GUI display. FIG. 4A shows a computer screen 401 with a GUI 402 in the form of a Windows (trade mark of Microsoft Corporation) desktop display. A general depiction of a desktop 409 is shown with a toolbar 403 at the bottom of the screen including a "start" button 404. Icons 405 representing applications and data items are displayed as well as windows 406, 407, 408 of active applications. The windows 406, 407, 408 may be overlayed with the current window 406 in the forefront.

The grid units allocated to the viewable area may be as small as a single pixel of the display with each item inherently taking up a block of grid units, or, for performance, a grid unit may be as large as the smallest element for display. For example, a grid unit could be the size of a task button, such as the "start" button 404 in Windows, or the "hat" button in RedHat Linux (trade marks of Red Hat, Inc. and Linux Online, Inc.).

Control buttons such as the "start" button or "hat" button are important because they provide a path to launching applications. Traditionally, important task buttons lie in a fixed position always taking up a specific place, which is configurable but fixed. Typically, such buttons form part of a fixed location task bar, with the only option being which edge of the screen, and whether it hides when a pointer such as a mouse is not hovering over its location.

In the described system, such important task buttons could simply be set as a high priority display item, with links to other icons normally found on the task bar, but with no other determination as to its location or arrangement. By default it could occupy the bottom of the screen. However, when re-sizing the active window, perhaps to better view an A 4 document, the user could resize to the full height of the screen, while the buttons relocate to some other free space.

Having determined the grid positions, the display is prioritized based on relevant information. In the case of a Windows type system, the current active window (and possibly some of the previously active windows) form the critical, high priority, space, which the user must be able to see unobstructed. The grid units in which these objects are located are marked as being unavailable. The remaining grid units then are divided among the other active objects to be displayed.

The display items are then allocated to grid locations with low priority content. Starting with the highest priority display item, along with the preferences for that item as to its location and any associated display items, the display items are allocated positions in the available units of the grid. For example, a display item may have a position preference of top left in the grid, with display items x,y,z to its left/right/top. The user may wish a standard set of quick launch icons to be joined to the main task launch button such that their display is determined with the first.

In this way the grid units can be found that best match the preference profile of a display item to display that item, along with any others it specifies. The process is then repeated with the remaining open grid units and the remaining display items to be displayed, until one or other is an empty list.

This is then repeated every time the user moves/re-sizes elements of his desktop. Where multiple desktops are used, this technology can simply allocate them as differing grid sets with their own priorities. So, lesser-used windows/displays may be moved to lower and lower priority virtual desktops.

Figure 4B:
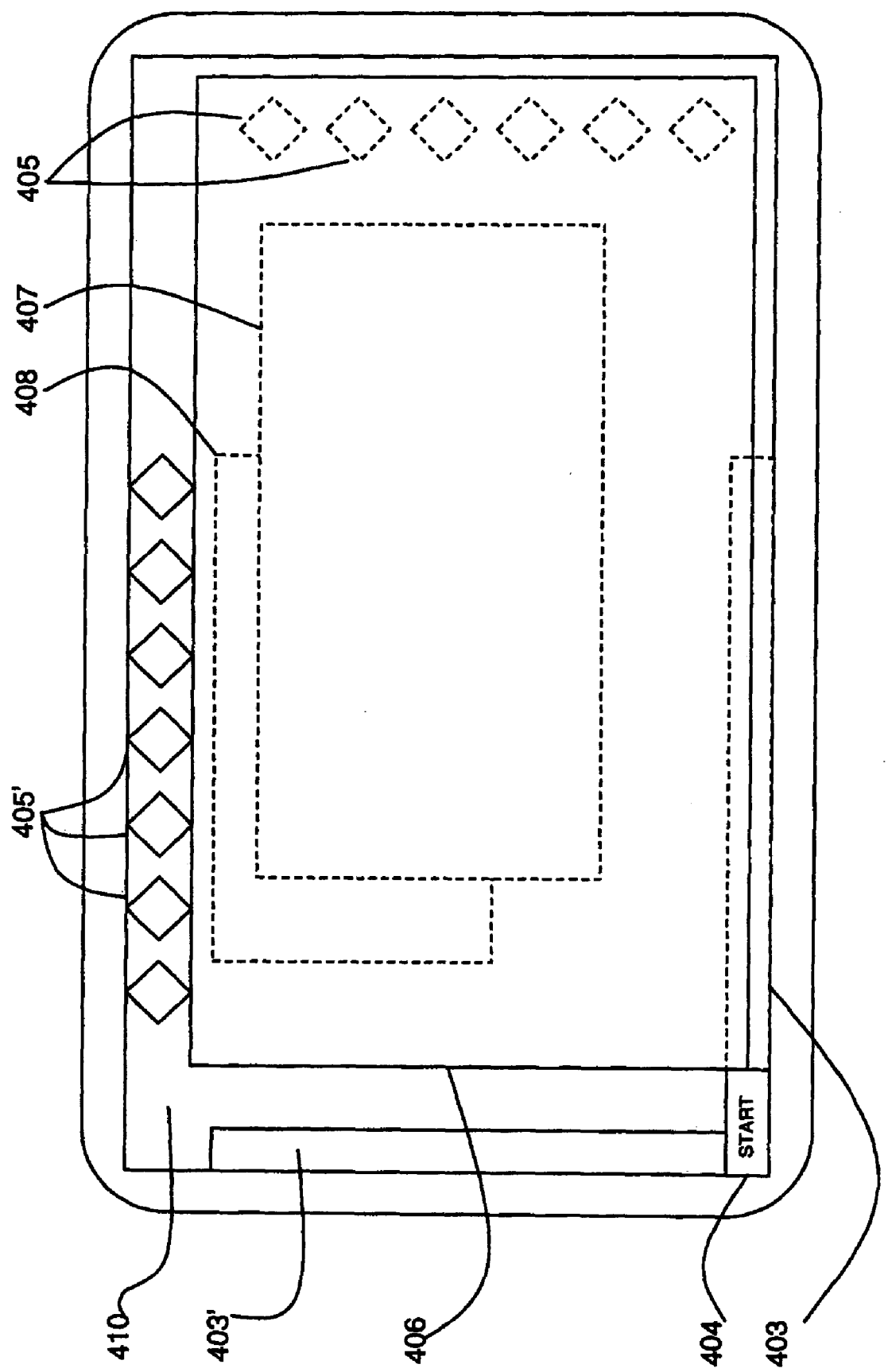

In FIG. 4B, the above embodiment is illustrated. The GUI 402 is shown in which the current window 406 has been enlarged to fill a high proportion of the desktop 409. The area of the current window 406 is a high priority content area in which no display items can be placed. The remaining area 410 above and to the left of the current window 406 is low priority content and available for display. The top priority display items are the toolbar 403, and one or more of the icons 405. These are allocated display areas in the low priority content area 410 and move accordingly. The new position of the toolbar 403' is to the left of the current window 406 and the icons 405' move to above the current window 406.

The second embodiment is an augmented reality display in which the viewable area is the display area in a HUD in a vehicle. Rather than direct motions of the user determining the priorities of the viewable area, the environment outside needs to be intelligently processed to determine the excluded areas for display items. Image recognition is required to identify the content of the view of the driver.

Vision enhancement systems which are known for use in cars use a system that determines the path of the road, and refocuses headlights to allow maximum illumination in the relevant areas. This kind of system has technology that takes a real time video feed and breaks down the parts of the image into useful computer understood terms. This form of system may be used by the expert system to interpret the content of viewable area.

The expert system may use more obvious circumstantial information. For example, moving in a straight line at a steady speed is likely to mean more things can be displayed (radio information, fuel consumption etc); however, erratic speed and change of direction might indicate situations requiring more concentration and as such displayed information is kept to a minimum, or stopped all together.

Figure 5A:
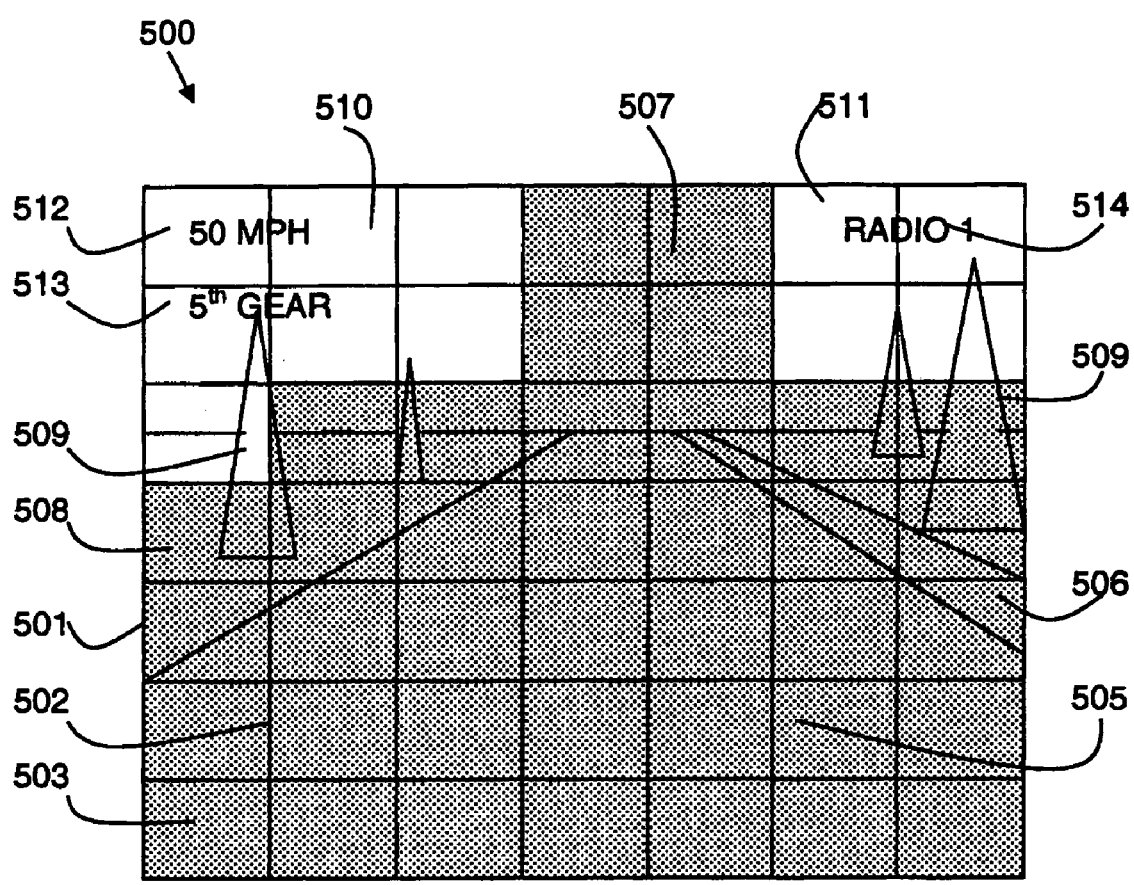
FIGS. 5A and 5B are schematic diagrams of a HUD in accordance with a second embodiment of the present invention.
Figure 5B:
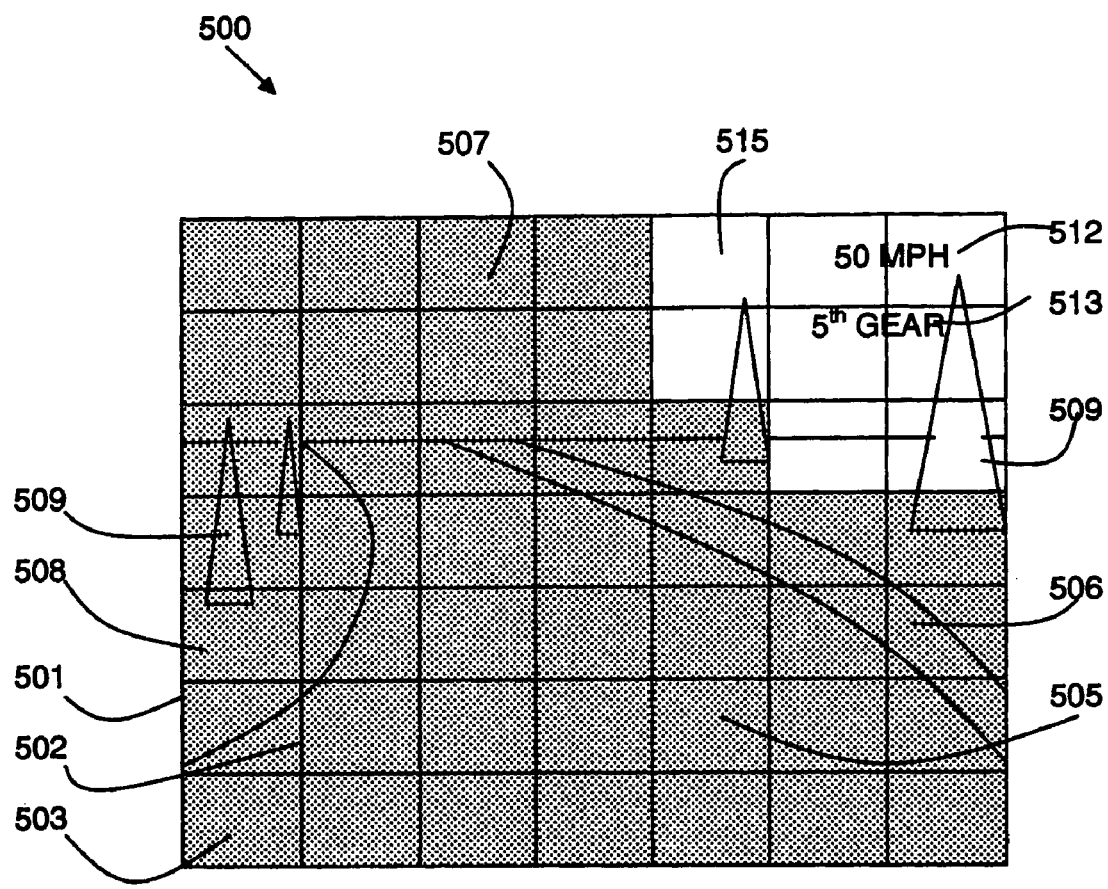

FIGS. 5A and 5B are simplified diagrams illustrating the conceptual view for a car HUD 500. The viewable area 501 is divided into a virtual grid 502 of grid units 503. The objects within the viewable area 501 are identified by a recognition engine. For example, the objects include the road 505, the pavement 506, the sky 507, grass 508 and trees 509.

The expert system identifies grid units 503 which are critical and should be left clear. In this example, this includes any units which contain road 505 or pavement 506 and any units adjacent the road 505 at important focal points, such as the sky 507 above the road. These critical units are shown with shading. The white units are available for display items as they do not contain objects of importance.

In FIG. 5A, there are two areas 510, 511 of white units which are available for display items. The larger area 510 shows display items 512, 513 relating to driving control information and the smaller area 511 shows a display item 514 relating to entertainment settings.

In FIG. 5B, the car is rounding a bend in the road and therefore, there is a single area 515 for display items. The display items 512, 513 relating to driving control information move to the single display area 515 and the display item 514 relating to entertainment settings disappears. This shows how display items can change and move when it becomes important to clear parts of the view from the clutter of information.

Of course, the system can have a great deal more subtlety than illustrated breaking down into grades of importance to see the objects in the viewable area, against grades of importance to see the available display items.

In the third embodiment, the viewable area is a visual display of a computer game. This is similar to the HUD embodiment for a vehicle with the simplification that a rendering engine should be able to determine what is being rendered and rate its importance. This can be fed into the HUD display algorithm, which then uses the non-important squares to display its elements as described above.

Below is a description, assisted by some logic statements/ pseudo code, of the generic implementation concept for this system.

This description focuses on the second embodiment on the case of a car HUD system, since the real world nature exposes the most complex issues of the three embodiments.

In this case the computer has a video stream which is fed to a recognition application (to determine what is road, sky, car, other etc.). The output of this image recognition is a grid, considered as a 2D collection of boxes which have a size, a location in the grid, and something to indicate the most relevant thing in the image at this location.

For example, in the case of a view of the road, grid units that are mostly over road will have a property set to ROAD, other examples might be TREE, GRASS, SKY, BUILDING, CAR these are all thing that the image recognition software would be able to recognize and classify in terms to be understood by the next step.

In the first embodiment of this system on a computer operating system, or the third embodiment of a game HUD, the software running the system "knows" what the objects being displayed are.

An individual grid unit referenced as grid (x,y) has properties:
TOPLEFT.X
TOPLEFT.Y
BOTTOMRIGHT.X
BOTTOMRIGHT.Y
WIDTH
HEIGHT
Content (ROAD/TREE/BUILDING/etc)—For the heuristic logic to reference.
CurrentlyOccupied?—Set when something is displayed in this grid already.
int CRITICAL—To be set based on the output of the heuristic logic, i.e. how important it is that this grid be unobscured by information.

An artificial intelligence engine can use an expert systems type heuristic approach to what is critical. (LISP, PROLOG) So,
ROAD=critical level 1
n grid squares above horizon=critical level 1
more than n grid squares above horizon (e.g. the body of the sky)=critical level 3
etc.

The grid can be represented as a picture of letters, where letters represent content. The following is a crude example where S=Sky, T=Tree, G=GRASS, R=ROAD.
SSSSSSSSS
SSSSSSSSS
STTSRRTST
TTTGRRTGG
GTGRRRGGG
GGRRRRRGG The advantage of this approach is that the road could be analyzed, by removing all but the R's and being left with a grid empty except a representation of the road shape. This can be compared to a selection of stored images of road shapes using basic image comparison techniques which are basically compression techniques. As such the stored shapes can be stored in compressed form, and the compressed version of the current display compared to them to find the best match. Each stored road type can then have its associated rules as to what parts of the viewable area are more important to remain uncluttered. This approach can work for many kinds of situations where you simply reduce the display down to basic types and compare to a store of similar images.

Any item between the road near the car and the road distant from the car is critical. Anything that is identified as a signboard, which should be easy to detect being flat reflective surfaces with writing on, is critical. Any area within x threshold of a critical area is a boarder area.

Other heuristics can also be encoded to, determine the level of information displayed. For instance, using sensors in a car to indicate speed/turn of the wheel, gear etc. A log of the last few minutes of activity of the sensors can enable a picture to be built up of whether the driver's full attention is required on the road, or if it is safe to bring in informational displays items.

For example,
If speed=0 and hand-brake engaged then display info level=max.
If speed constant over last 20 seconds, and turning within minimum threshold then display info=all driving-related.
If speed not constant for last 60 seconds and turning above minimum threshold then display info=level 2.
If acceleration ±5 mph/s then display info=level 1.
If indicators activated then display level=min.
etc.

These information levels can then be used by the second pass of the grid which decides what moveable/configurable data is allowed to be placed and places it based on specified preferences.

The rule set can be changed for different applications. The basic functionality and layout of this system apply to at least the three embodiments described, and in the same way to each. A real world example clearly has more work in identifying relevant pieces of the image, and the applied rule set will change based on the application. However, the method and most of the processing remains the same.

The user's view is considered in two main sets. There are the informational display items and the world view. In the case of an operating system, the world view is all the application windows, and the informational display items are things such as the clock, task bar, "start" button, icons, etc. In the case of a game HUD, the world view is a 3D rendered environment onto which useful data is displayed, such as ammo/health/map/compass/messages from other players. And, of course, in the case of a car system the world view is literally that, and the informational display items could be anything such as:
speed;
gear;
acceleration;
distance to car in front;
stereo displays (radio station, cd track number/title/song/ playing time, etc.);
traffic information; and
directions.

All of these can be ranked in importance both by the user and by legal requirements.

Having now got a grid overlay for the world view with grades of importance to the user, the informational display items can be placed appropriately.

First, a list is generated of what is to be displayed. This is from a global list of what is available, in which the items are configurable in importance either before hand or dynamically to suit the situation. The expert system's analysis will provide an information level to be accepted, but can also adjust the importance of specific information for the current situation. So when accelerating a speed gauge is more important than when cruising. When landing a plane in a game (or in reality) altitude/course etc. might be more important than ammo count/weapon selection. This expert system can also dynamically adjust the display preferences for the items, either to specific locations or to linked information.

All display items that are deemed not important enough to display at the current time are removed. From the output of the heuristic rules comes a display level to be accepted. The remaining are ordered by importance.

Display items must be given properties that indicate their size in relation to the size of a single grid unit. Placing an item in a non-critical grid unit must not cause overlap into a critical grid unit. Hence, bigger grid units make processing easier, but reduce granularity of placement.

The dispItem (display item) properties can be:
WIDTH;
HEIGHT;
dispLevel;
itemList—list of one or more displayable items that are considered a logical display unit.
GRID(x,y) ? 2D array of grid objects.
DispItem(n) ? ordered list of things to display, the "DispItem" might be a single piece of information or a group of linked pieces as determined by the expert system.
len=length of DispItem list.

```
DO
if (Grid(x,y).WIDTH*i / DispItem(n).Width > 1)
{
# item is narrower than i grid squares
if (Grid(x,y).HEIGHT*n / DispItem(num).HEIGHT > 1)
{
display item will fit in the height of n grid squares.
break
}else{
n=n+1
}
}else{
i=i+1
}
LOOP
``` established the number of grid square together required for display of this item.
now need to find a set of that many that are of a lower importance than this display.

it is assumed that no displayable piece of information requires more grid squares than there are on the screen to display.
minimize processing first consider the stated preference for display location case DispItem(num).DisplayPref
  TOPRIGHT: start from top right grid square, counting left to the middle to find i consecutive grid squares. If none, then drop one row and try again, continuing until halfway down display. When the first set is found, check for n squares down. If all grid squares are less important than DispItem(num) then display and mark those grid squares as occupied. Else continue scanning for appropriate area. If nothing appropriate in this quadrant, move to the next (user could specify order for trying, e.g. if it will not go top left, try top right next . . . ).
  TOPLEFT: as above but starting top left and working right and down.
  BOTTOMRIGHT: as above but from bottom right working left and up.
  BOTTOMLEFT: as above but from bottom left working right and up.
if DispItem(num). displayed !=true then
{
  #loop through the remaining display items and remove those which will obviously also not fit for iterator 0→len
  if dispItem(iterator).WIDTH>=dispItem(num)WIDTH && dispItem(iterator.HEIGHT)>=dispItem (num).HEIGHT && dispItem(iterator). dispLevel<=dispItem(num).dispLevel
  num=num−1//since the item was not displayed and was removed from the list, deduct the iterator so any item that now occupied the same number in the list are not missed
}
if dispItem(num). displayed then num++
if dispItem.size>num then loop to start //if there are still items in list beyond the last processed item then loop to beginning with next DgispItem.

The end result will be to have displayed all items that there was currently space for, in order of importance. This may mean that two lower importance items are displayed while a larger more important item is not, but only because there was not room for the larger item.

Of course, all this is the first pass, but most of the time items will be displayed currently. The job is to work out if they are to move. This is done by comparing the grid location for display from the above logic, to the current displayed location. If it is different then the item can be moved, either directly, or through some animated translation of the displayed item through the space in-between.

Obviously, it is not acceptable to have items jumping all over the place continuously, so the rate at which the display is reviewed can be adjusted to suit the purpose. It would be simple to decide that an item will only actually move if its currently displayed location has become critical to keep clear, or after a certain time after its prime location becomes clear.

In the case of a Windows operating system, the need to go through this loop will only occur relatively infrequently when the user causes the displayed "world view" to change. In games and in the real world the world view changes much more rapidly.

This same process can be used to make sure relevant information displays are displayed next to each other at the right times. Studies have shown that pilots are better at keeping on top of multiple tasks, e.g. maintaining altitude and correct path (specifically fighter pilots), where those informational displays are close to each other. This is because the brain has a harder time concentrating on both if they are at different places in their field of view. By using the technique above to chose what information pairings are most useful at this time, rather than having to have one layout, the most important info for the situation can be displayed in the best possible position.

The present invention is typically implemented as a computer program product, comprising a set of program instructions for controlling a computer or similar device. These instructions can be supplied preloaded into a system or recorded on a storage medium such as a CD-ROM, or made available for downloading over a network such as the Internet or a mobile telephone network.

Improvements and modifications can be made to the foregoing without departing from the scope of the present invention.

The invention claimed is:

1. A method for re-arranging a display in a viewable area, comprising:
   dividing the viewable area into units, the viewable area including first objects to be displayed;
   determining the contents of units of the viewable area that includes the first objects by:
      representing the units as a picture of letters wherein the letters represent first objects of the contents, different letters being used to indicate different first objects;
      identifying a particular first object by removing letters not associated with the particular first object to form a compressed form of the particular first object;
      storing the compressed form of the particular first object;
      comparing the compressed form of the particular first object with a plurality of stored images of respective known types to find a match that indicates the type of the particular first object, each first object type having a respective associated rule that indicates importance that the first object type remain uncluttered;
   prioritizing into 3 or more grades of importance the availability of the units for display of objects other than the first objects according to the contents of the units, the prioritizing into 3 or more grades of importance including considering first object type and the associated rule that indicates importance that the first object type remain uncluttered;
   supplying display items including second objects to be displayed in the viewable area, the second objects being different from the first objects;
   prioritizing each second object for display according to importance that it be displayed; and
   allocating one or more display items for display in the viewable area as a function of both the first prioritizing step of prioritizing the availability of the units for display of objects other than the first objects and the second prioritizing step of prioritizing each second object for display according to importance that it be displayed.

2. The method of claim 1, wherein a plurality of display items are provided and are allocated according to a determined order.

3. The method of claim 2, wherein the determined order is by one or more of the following determinations:
   a user preference;
   the contents of the viewable area;
   the activity of the user; and
   environmental parameters.

4. The method of claim 1, wherein the number of display items is determined by one or more of the following determinations:
   a user preference;
   the contents of the viewable area;
   the activity of the user; and
   environmental parameters.

5. The method of claim 1, wherein one or more display items may have allocation preferences determining their position and association with other display items.

6. The method of claim 1, wherein the step of determining the contents of the viewable area translates the contents into computer understood terms.

7. The method of claim 1, wherein the step of prioritizing the availability of the units for display of objects other than the first objects according to the contents of the units excludes some units from availability for display.

8. The method of claim 1, wherein the viewable area is divided into a virtual grid of grid units.

9. The method of claim 1, wherein the following steps are repeated at regular intervals:
   determining the contents of units of the viewable area that includes the first objects;
   prioritizing into 3 or more grades of importance the availability of the units for display of objects other than the first objects according to the contents of the units;
   supplying display items including second objects to be displayed in the viewable area, the second objects being different from the first objects;
   prioritizing each second object for display according to importance that it be displayed; and
   allocating one or more display items for display in the viewable area as a function of both the first prioritizing step of prioritizing the availability of the units for display of objects other than the first objects and the second prioritizing step of prioritizing each second object for display according to importance that it be displayed.

10. The method of claim 1, wherein the steps of determining the contents of units of the viewable area, prioritizing the availability of units by content, and allocating one or more display items in the prioritized available units are repeated when the contents change.

11. A computer program product stored on a non-transitory computer readable storage medium, comprising computer readable program code that rearranges a display in a viewable area by performing the steps of:
   dividing the viewable area into units, the viewable area including first objects to be displayed;
   determining the contents of units of the viewable area that includes the first objects by:
      representing the units as a picture of letters wherein the letters represent first objects of the contents, different letters being used to indicate different first objects;
      identifying a particular first object by removing letters not associated with the particular first object to form a compressed form of the particular first object;
      storing the compressed form of the particular first object;
      comparing the compressed form of the particular first object with a plurality of stored images of respective known types to find a match that indicates the type of the particular first object, each first object type having a respective associated rule that indicates importance that the first object type remain uncluttered;
   prioritizing into 3 or more grades of importance the availability of the units for display of objects other than the first objects according to the contents of the units, the prioritizing into 3 or more grades of importance including considering first object type and the associated rule that indicates importance that the first object type remain uncluttered;
   supplying display items including second objects to be displayed in the viewable area, the second objects being different from the first objects;
   prioritizing each second object for display according to importance that it be displayed; and
   allocating one or more display items for display in the viewable area as a function of both the first prioritizing step of prioritizing the availability of the units for display of objects other than the first objects and the second prioritizing step of prioritizing each second object for display according to importance that it be displayed.

* * * * *